Feb. 10, 1925.
T. H. THOMAS
1,525,627
FEED VALVE DEVICE
Filed Jan. 25, 1922
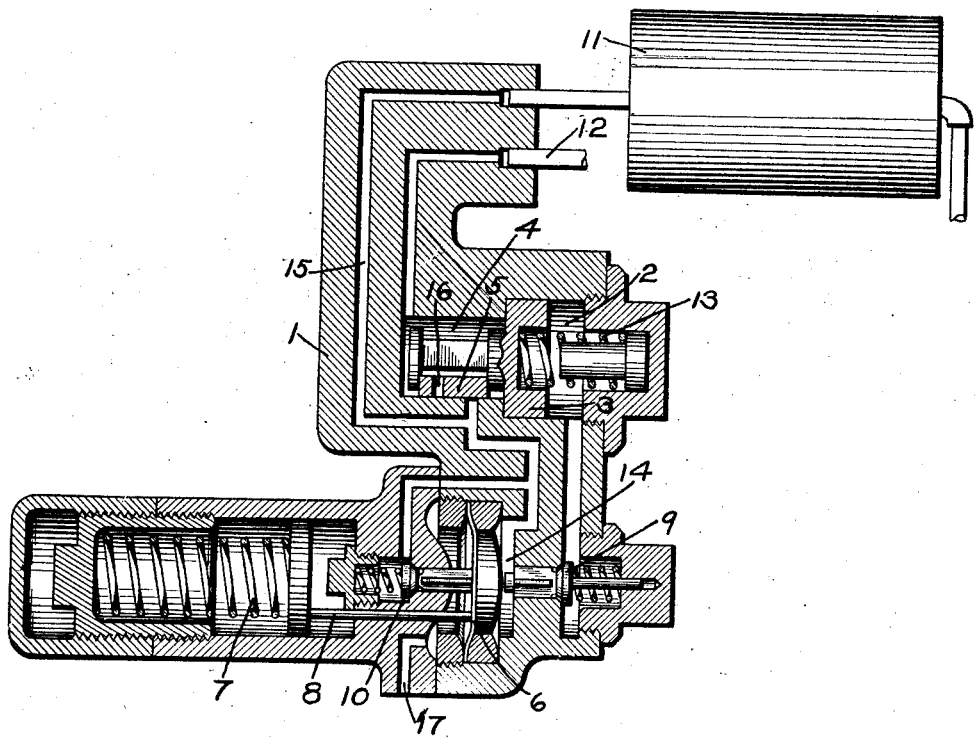
INVENTOR
THOMAS H. THOMAS
BY *Wm. M. Cady*
ATTORNEY Patented Feb. 10, 1925.

1,525,627

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FEED-VALVE DEVICE.

Application filed January 25, 1922. Serial No. 531,677.

*To all whom it may concern:*

Be it known that I, THOMAS H. THOMAS, a citizen of the United States, residing at Edgewood, in the county of Allegheny and State of Pennsylvania, have invented new and useful Improvements in Feed-Valve Devices, of which the following is a specification.

This invention relates to a feed or reducing valve device for supplying fluid under pressure at a predetermined reduced pressure to a fluid pressure system.

In some cases where a feed or reducing valve device is employed, it is desired to maintain the outlet pressure as near to a constant pressure as possible and particularly where the feed valve device supplies fluid at a reduced pressure to a reservoir or receptacle of relatively limited size, the feed valve device may, through leakage or the like, permit the pressure in the reservoir to exceed the predetermined pressure desired.

The principal object of my invention is to provide a feed valve device having means for reducing the outlet pressure when the same exceeds a predetermined degree.

In the accompanying drawing, the single figure is a central sectional view of a feed or reducing valve device embodying my invention.

As shown in the drawing, the feed valve device may comprise a casing 1, having a piston chamber 2, containing a piston 3 and a valve chamber 4, containing a slide valve 5 adapted to be operated by the piston 3 for controlling the supply of fluid from a source of pressure to a fluid pressure system. For controlling the operation of piston 3, a flexible diaphragm 6 is provided, which is subject on one side to the pressure of an adjustable coil spring 7, the pressure of which is transmitted to the diaphragm 6 through a rod 8. Movement of the diaphragm 6 in one direction is adapted to open a pilot valve 9 for venting fluid under pressure from the piston chamber 2 and movement in the opposite direction is adapted to operate a valve 10 for venting fluid under pressure from the reservoir 11, to which the feed valve device supplies fluid under pressure in the normal operation. A source of fluid under pressure is connected through pipe and passage 12 with the valve chamber 4 and in operation fluid equalizes around the loose fitting piston 3 to piston chamber 2, when the valve 9 is closed, permitting spring 13 to move the piston 3 and slide valve 5 to the closed position, as shown in the drawing.

The spring 7 being adjusted for the reduced pressure desired in the fluid pressure system, and the chamber 14 at the opposite side of the diaphragm 6 being open through passage 15 to the outlet pressure, when said outlet pressure is less than the predetermined degree for which the spring 7 is adjusted, the diaphragm 6 will be shifted by the spring 7 to open the valve 9 and vent fluid from piston chamber 2 to the passage 15. The piston 3 then operates the slide valve 5, so that port 16 registers with passage 15 and then fluid under pressure is supplied from valve chamber 4 and the source of fluid under pressure to the reservoir 11. When the pressure in the reservoir 11 and in diaphragm chamber 14 equals or slightly exceeds the pressure of spring 7, the diaphragm is moved to permit the valve 9 to seat. The fluid pressures on opposite sides of the piston 3 then equalize and the spring 13 shifts the piston 3 and slide valve 5 to the closed position.

If for any reason, such as leakage or otherwise, the pressure in the reservoir 11 should exceed the pressure for which the feed valve is adjusted to maintain, then the excess pressure will operate in chamber 14 on diaphragm 6 to shift the diaphragm in the direction to open the valve 10. Fluid under pressure will then be vented from reservoir 11 through passage 15 to exhaust port 17, until the pressure in the reservoir has been reduced sufficiently to permit the spring 7 to move the diaphragm 6 and thus allow the valve 10 to seat and cut off the further venting of fluid from the reservoir 11.

By means of the above construction, the pressure of fluid in the reservoir 11 may be maintained substantially constant within a relatively narrow range since either a slight reduction or a slight increase in pressure below or above the predetermined degree for which the spring 7 is adjusted, will operate the feed valve device to compensate for the change in pressure.

Having now described my invention, what I claim as new and desire to secure by Letters Patent, is:—

1. A feed or reducing valve device comprising an outlet chamber, a valve for supplying fluid under pressure to said chamber, a piston for operating said valve, a movable abutment subject to the opposing pressures of a spring and the pressure in said chamber, a valve operated by said abutment for varying the fluid pressure on said piston, and a valve operated by said abutment for venting fluid from said chamber.

2. A fluid pressure reducing valve device comprising a chamber, means for supplying fluid under pressure to said chamber, a valve for varying the fluid pressure on said means, a movable abutment for operating said valve, and a valve operated by said abutment for venting fluid from said chamber.

In testimony whereof I have hereunto set my hand.

THOMAS H. THOMAS.